United States Patent [19]

Chulich

[11] Patent Number: 4,585,142
[45] Date of Patent: Apr. 29, 1986

[54] HIGH-CAPACITY FOOD WARMER COVER

[76] Inventor: Anthony J. Chulich, 10512 Dorothy Ave., South Gate, Calif. 90280

[21] Appl. No.: 706,012

[22] Filed: Feb. 27, 1985

[51] Int. Cl.⁴ .................. B65D 43/14; B65D 51/04
[52] U.S. Cl. .................................. 220/331; 220/377; 312/138 R
[58] Field of Search ............ 220/331, 345, 212, 377; 312/138 R

[56] References Cited

U.S. PATENT DOCUMENTS 2,631,912  3/1953  Pryor, Jr. ........................... 220/331
4,260,069  4/1981  Juergens ............................. 220/331

Primary Examiner—George T. Hall
Attorney, Agent, or Firm—Weissenberger and Peterson

[57] ABSTRACT

A food warmer cover is equipped with an inclined door which forms an effective seal against a pair of shoulders formed in the enclosure of the cover. The door pivots about the tops of the shoulders and slides horizontally into the enclosure to make room for lateral guides inside the enclosure. The guides support the door and also support several warming pans in sliding relationship. The door can be pivoted up and away from the enclosure for cleaning, and it is self-aligning when it is replaced following cleaning.

17 Claims, 7 Drawing Figures

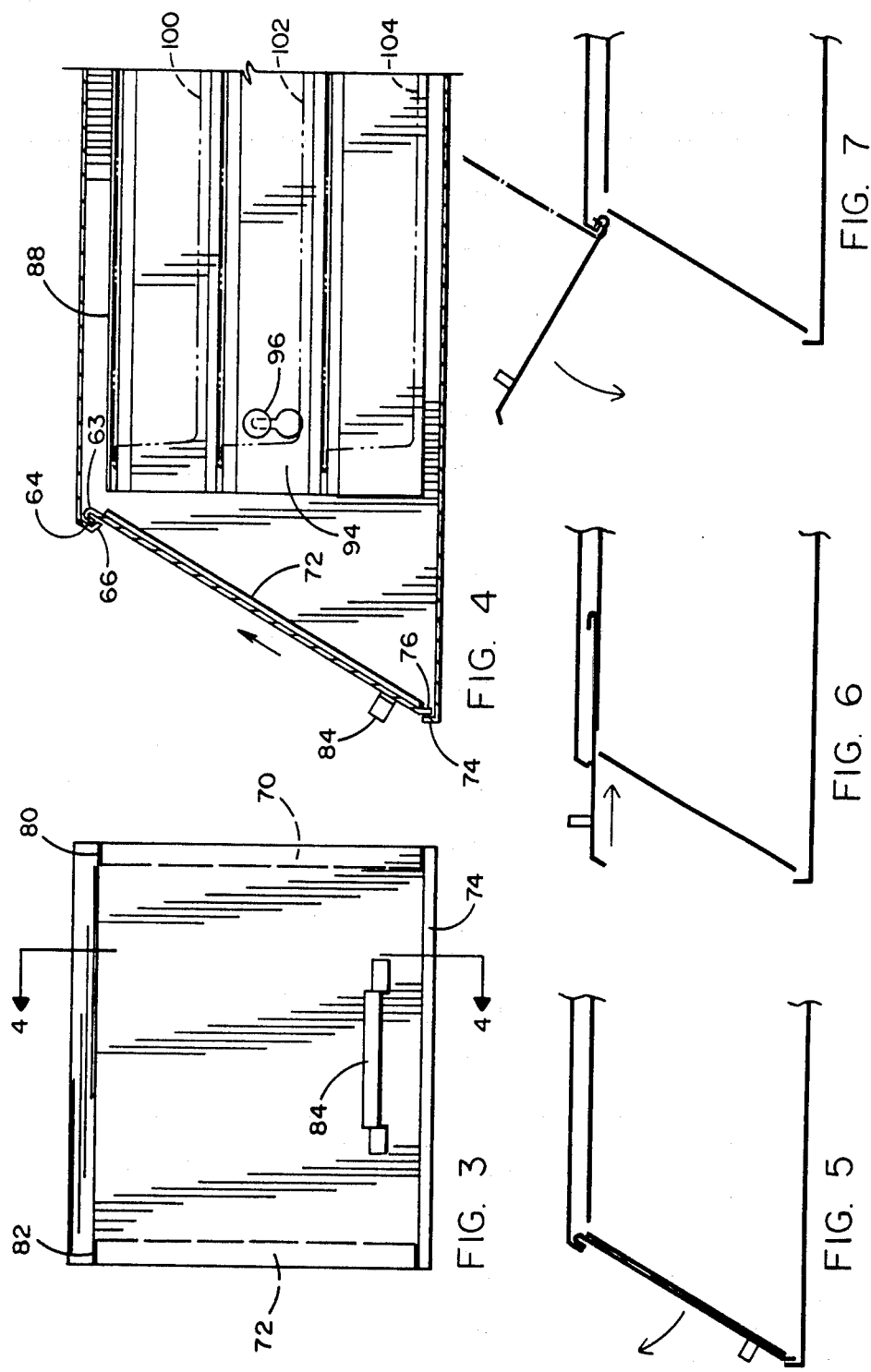

HIGH-CAPACITY FOOD WARMER COVER

FIELD OF THE INVENTION

This invention relates to food warmer covers, and more particularly to a sealing cover which is of simple construction and easy to clean, yet allows the capacity of the warmer to be substantially increased without the need for additional heat energy.

BACKGROUND OF THE INVENTION

Food warmers are widely used in restaurant kitchens to maintain batches of prepared foods at a predetermined temperature while portions thereof are served from time to time. Typically, a food warmer consists of a heated basin, usually built into a counter surface, into which various standard-sized food pans can be placed.

Health regulations (as well as taste considerations) require food stored in warmers to be maintained at a uniform temperature at all points within the pan, an objective which is difficult to achieve in an open warmer. Also, the gas or electricity used to keep foods warm is a major expense in a restaurant operation, and loss of moisture in warmed foods is a substantial problem.

Various types of food warmer covers have previously been used to prevent heat and moisture loss. The simplest type, a hinged flat cover, presents handling problems because it gets very hot, and it also tends to get in contact with the food when pans are very full.

To overcome these disadvantages, box-type covers have previously been proposed. These covers had an inclined front opening with a pivotable door which could be conveniently pivoted upwardly into the cover enclosure to access the front portion of the food warmer (the back portion being usually used to store a reserve pan of food). This type of cover, though an improvement over the flat cover, still had some disadvantages: it tended to direct heat or steam toward the cook's arm when opened, and it occupied a substantial amount of space without an attendant increase in food storage capacity. Also, it allowed substantial amounts of heat or steam to escape, and it was somewhat difficult to clean.

SUMMARY OF THE INVENTION

The present invention provides a box-type food warmer cover of simple, inexpensive construction which effectively seals the cover enclosure against the escape of heat or steam when closed, greatly reduces the chance of scalding when opened, is easy to clean, and multiplies the food storage capacity of the warmer so as to greatly reduce the amount of heating fuel or power required per pound of food.

The invention achieves these objectives by providing a generally flat door with a hook-shaped flange. The flange cooperates with an inclined lip formed along the top of the cover enclosure to cause the door to seal by gravity against the lip and against inclined shoulders of the enclosure along the sides of the door opening when the door is closed. This seal results in a substantial saving of heat energy by effectively containing hot air or steam within the cover enclosure when the door is closed.

Using the top of the shoulders as pivot points and the flange as a spacer to hold the door horizontal, the door can be pivoted up and then slid horizontally into the enclosure so as to rest on horizontal supports adjacent the top of the enclosures when opened. The door can easily be removed for cleaning by raising it to a vertical position so as to cause the flange to become disengaged from the lip and to slide downwardly in front of the shoulders.

The above-described door construction makes it possible to provide guide rails on the inner side walls of the cover enclosure, on which additional food pans can be suspended to greatly increase the capacity of the warmer without expending any additional heating fuel or power. In an additional aspect of the invention, the guide rails are made readily removable for cleaning, and the guide rails also provide the horizontal support for the door.

BRIEF DESCRIPTION OF THE DRAWINGS

FIG. 3 is a front elevation of the cover of FIG. 2; with the door closed;

FIG. 4 is a vertical section along line 4—4 of FIG. 3;

FIG. 5 is a section similar to FIG. 4 but with the door being opened;

FIG. 6 is a section similar to FIG. 4 but with the door fully opened;

FIG. 7 is a section similar to FIG. 4 but illustrating the removal of the door.

DESCRIPTION OF THE PREFERRED EMBODIMENT

Figure 1:
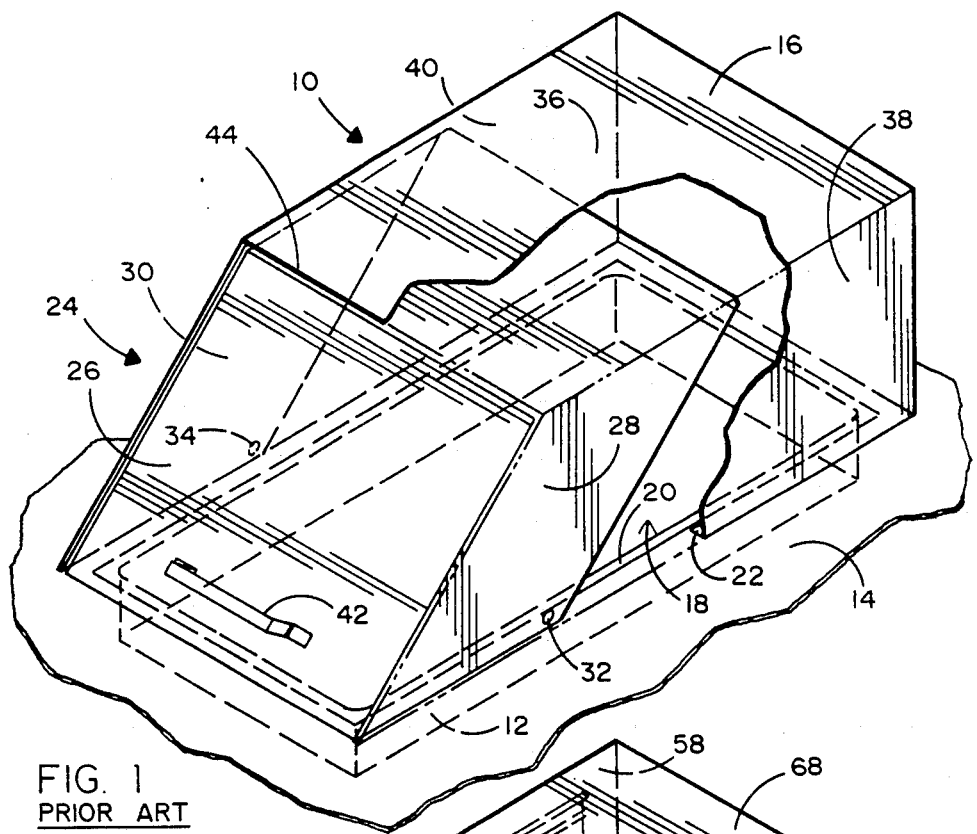
FIG. 1 is a perspective view, partially broken away, of a prior art box-type cover.

FIG. 1 shows a prior art cover 10 placed over a food warmer 12 in a counter surface 14. The cover 10 has an enclosure 16 with an open bottom 18 through which the pan 20 of the warmer 12 is accessible. The rim 22 of the cover bottom 18 seals the cover 10 against the counter surface 12.

The enclosure 16 has an open front 24 inclined at about a 45° angle. The front 24 can be closed off by a door 26 connecting a pair of wings 28, 30 which can pivot, respectively, about pins 32, 34. A stiffening plate 36 connects the wings 28, 30 adjacent the top end of door 26.

With the door 26 closed, heat or steam can escape from the cover 10 between the side walls 38, 40 of the enclosure 16 and the wings 28, 30. (To prevent binding, some spacing is necessary between the side walls and the wings). Also, when the door 26 is opened, the stiffening plate 36 forms a deflector which cooperates with the wings 28, 30 to direct heat or steam trapped in the enclosure 16 forward onto the arm of the person opening the door 16.

A considerable heat loss is caused by the inclination of the open front 24, which allows a great deal of heat to escape vertically even if the door 16 is open for only a short moment. The inclination of front 24 is necessary, however, for the wings 28, 30 to hit the rim 22 when the door 16 is open, and thereby to prevent pinching of the cook's hand between the door handle 42 and the front top edge 44 of the enclosure 16.

Figure 2:
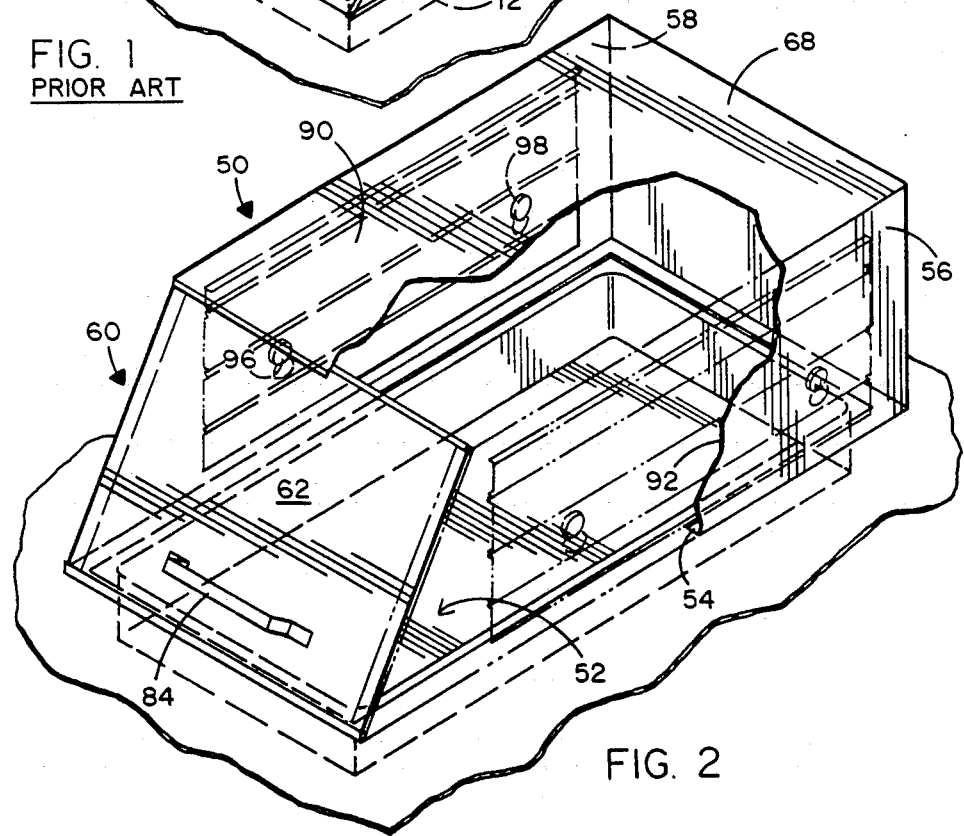
FIG. 2 is a perspective view, of a box-type cover, partially broken away, constructed in accordance with this invention.

To overcome these disadvantages and give the cover of this invention additional capabilities, a novel door mechanism as shown in FIGS. 2 through 8 is provided in this invention. Referring first to FIG. 2, the inventive cover is shown at 50. As in the prior art, the cover 50 has an open bottom 52 with a sealing rim 54; side walls 56, 58; and an open front 60 closed by a door 62. The front 60, however, is inclined at a much steeper angle than the front 24 of the prior art, thereby providing a smaller surface for the escape of heat when the door 62 is open.

The steeper angle of front 60 is made possible by the construction of door 62, which is best illustrated in FIGS. 3 through 7. The door 62 consists of a flat plate whose upper edge is bent forward upon itself to form a flange 64 connected to the main part of the door 62 by a generally semicircular crown 63. The edge of flange 64 rests on an inclined lip 66 formed on the enclosure 68 along the top of the front 60. When the door 62 is closed, the flange 64 slides downwardly and rearwardly on the lip 66 by gravity, and thereby biases the sides of door 62 into sealing engagement with the shoulders 70, 72 formed on the side walls 56, 58, respectively, of the enclosure 68. The seal is quite effective even with dry heat, but it is even better with steam because of the capillary action of water which creates a sealing cushion between the door 62 and the shoulders 70, 72.

Although the seal is more important toward the top of the front 60 (because heat and steam rise), a low wall 74 is preferably formed on the enclosure 68 along the bottom of front 60 to catch the bottom edge 76 of door 62 and bias it also against the shoulders 70, 72. It will be noted that with the door 62 closed, the seal of flange 64 against lip 66, door 62 against shoulders 70, 72, and door edge 76 against wall 74 completely seals the enclosure 68 except for a pair of small openings dictated by manufacturing tolerances at the upper ends 80, 82 of the shoulders 70, 72.

As best shown in FIGS. 4 and 6, the door 62 is opened by grasping its handle 84, lifting its bottom edge 76 clear of wall 74, and pivotally sliding it across the top edges 80, 82 of shoulders 70, 72 or the edge of lip 66. When the door 62 is horizontal, it can be slid rearwardly into the enclosure 68 on the horizontal supports 86, 88 which hold it adjacent the top 90 of enclosure 68. Because the door 62 has no wings like door 26, heat and steam tend to escape around its upper sides when it is opened, thus greatly reducing the danger of scalding the cook's arm.

The door 62 can easily be removed for cleaning (FIG. 7) by swinging it all the way up (dot-dash lines) and allowing the flange 64 to become disengaged from lip 66 and slide down in front of the shoulders 70, 72. When the door 62 is re-hung, it pivots about the edge of flange 64 (solid lines in FIG. 7), and the rounded shape of crown 63 prevents it from binding against the upper ends 80, 82 of shoulders 70, 72.

A major advantage of the cover of this invention results from the fact that no part of the door 62 moves across the side walls 56, 58 except along their top. It is therefore possible to suspend guide rails 92, 94 from the side walls 56, 58. The guide rails 92, 94 are preferably hung from pins 96, 98 so that they can easily be removed for cleaning.

The guide rails 92, 94 provide a means for slidingly suspending several additional pans 100, 102, 104 inside the cover 50. It is thus possible to maintain substantially larger quantities of food at the required temperature without expending any additional heating fuel or power. The guide rails 92, 94 may advantageously have top flanges which form the horizontal supports 86, 88 for the door 62.

The inclination of front 60 makes it necessary for the pans 100, 102, 104 to be smaller than the pan 20. For example, if pan 20 is a standard full size, pan 100 may be a standard ⅓ size, pan 102 may be a standard ½ size, and pan 104 maybe a standard ⅔ size.

Figure 8:
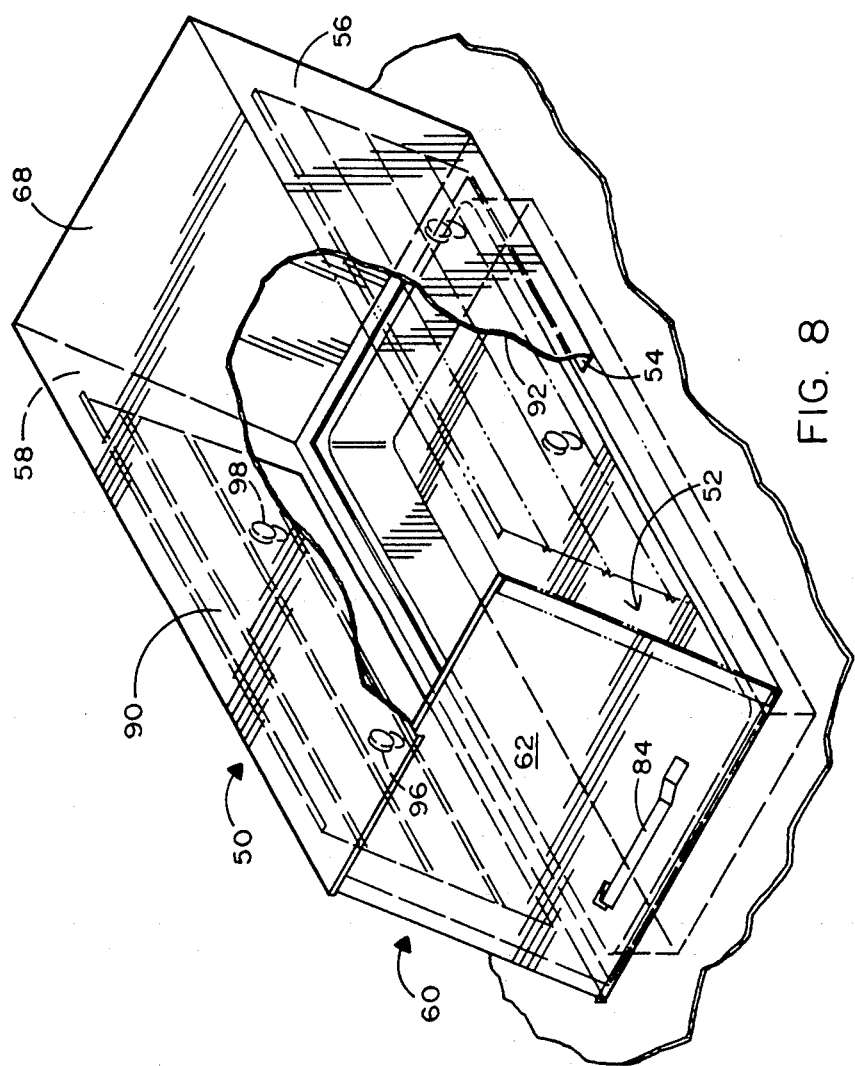
FIG. 8 is a perspective view similar to FIG. 2 but showing an alternative embodiment of the cover enclosure.

The foregoing limitation may be avoided by the embodiment of FIG. 8, in which the rear wall 106 of enclosure 68 is inclined at the same angle as the front 60. In that embodiment, full-sized pans can be used for pans 100, 102, although pan 104 still has to be ⅔ size for access to pan 20.

I claim:
1. A food warmer cover, comprising:
   (a) an open-bottomed enclosure dimensioned for placement over a warming pan in generally sealing relationship thereto;
   (b) said enclosure having an open front, and shoulders protruding partially from the side into said open front;
   (c) said enclosure further having a downwardly inwardly extending lip disposed along the top of said open front;
   (d) generally horizontal supports extending inwardly along the sides of said enclosure at a level close to the level of said lip;
   (e) the upper end of said shoulders being positioned slightly below said lip; and
   (f) a generally planar door selectively closing said open front; said door having a downwardly outwardly extending flange along its top;
   (g) whereby said door may be pivoted about said upper ends of said shoulders and slid rearwardly through the space between said upper shoulder ends and said lip to rest on said supports, the edge of said flange sliding downwardly rearwardly on said lip when said door is closed so as to bias the sides of said door into sealing engagement with said shoulders while the engagement of said flange with said lip provides a seal along the top of said door.

2. The cover of claim 1, in which said upper ends of said shoulders are positioned rearwardly of the edge of said lip so that, when said door is swung to a generally vertical position above said open front, said flange can disengage from said lip and move downwardly in front of said shoulders to allow removal of said door.

3. The cover of claim 1, in which said flange is connected to said door by a generally semicircular crown.

4. The cover of claim 3, in which said flange is substantially parallel to the plane of said door.

5. The cover of claim 1, in which said shoulders form a generally right angle with the sides of said enclosure.

6. The cover of claim 1, in which said front is downwardly forwardly inclined.

7. The cover of claim 6, in which said enclosure has an upstanding wall along the bottom of said open front, and said door has a bottom edge positioned behind said wall when said door is closed.

8. The cover of claim 7, in which said wall and bottom door edge are generally vertical.

9. A multi-pan food warmer cover, comprising:
   (a) an open-bottomed enclosure dimensioned for placement over a first warming pan in generally sealing relationship thereto;
   (b) said enclosure having an open front, and door means for selectively closing said front; and (c) generally horizontal guide rail means interiorly disposed on the side walls of said enclosure for removably supporting additional warming pans in vertically spaced horizontally movable relationship to each other;

(d) said door means when open being horizontally positionable inside said enclosure above said additional pans.

10. The cover of claim 9, in which said guide rail means are removably suspended on said side walls.

11. The cover of claim 10, in which said guide rail means on each of said side walls are unitary.

12. The cover of claim 11, in which said door supports are the top surfaces of said unitary guide rail means.

13. The cover of claim 9, in which said open front and the rear wall of said enclosure are both downwardly forwardly inclined.

14. A multi-pan food warmer cover, comprising:

(a) an open-bottomed enclosure dimensioned for placement over a first warming pan in generally sealing relationship thereto;

(b) said enclosure having an open front, and shoulders protruding partially from the side into said open front;

(c) said enclosure further having a downwardly inwardly extending lip disposed along the top of said open front;

(d) generally horizontal supports extending inwardly along the sides of said enclosure at a level slightly below said lip;

(e) the upper end of said shoulders being positioned slightly below said lip;

(f) a generally planar door selectively closing said open front, said door having a downwardly outwardly extending flange along its top; and (g) generally horizontal guide rail means interiorly disposed on the side walls of said enclosure for removably supporting additional warming pans in vertically spaced horizontally movable relationship to each other;

(h) said guide means having an upper surface which forms said generally horizontal supports.

15. The cover of claim 14, in which said upper ends of said shoulders are positioned rearwardly of the edge of said lip so that, when said door is swung to a generally vertical position above said open front, said flange can disengage from said lip and move downwardly in front of said shoulders to allow removal of said door.

16. The cover of claim 14, in which said flange is connected to said door by a generally semicircular crown.

17. The cover of claim 16, in which said flange is substantially parallel to the plane of said door.

* * * * *

UNITED STATES PATENT AND TRADEMARK OFFICE
CERTIFICATE OF CORRECTION

PATENT NO. : 4,585,142
DATED : 29 April 1986
INVENTOR(S) : A.J. Chulich

It is certified that error appears in the above—identified patent and that said Letters Patent is hereby corrected as shown below:

Col. 3, line 12      "7" should read --17--;

Signed and Sealed this

Twenty-sixth Day of August 1986

[SEAL]

Attest:

Attesting Officer

DONALD J. QUIGG

Commissioner of Patents and Trademarks